(12) United States Patent
Heremans et al.

(10) Patent No.: US 7,009,384 B2
(45) Date of Patent: Mar. 7, 2006

(54) SENSOR ASSEMBLY COMBINING SIGNALS WITH ENHANCED ASYMMETRY FOR DETECTING DIRECTION OF ROTATION OF AN OBJECT

(75) Inventors: Joseph Pierre Heremans, Troy, MI (US); Bruno P. B. Lequesne, Troy, MI (US); Thaddeus Schroeder, Rochester Hills, MI (US); Avoki M. Omekanda, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 289 days.

(21) Appl. No.: 10/453,041

(22) Filed: Jun. 3, 2003

(65) Prior Publication Data
US 2003/0205998 A1    Nov. 6, 2003

Related U.S. Application Data

(63) Continuation-in-part of application No. 09/777,764, filed on Feb. 6, 2001, now Pat. No. 6,639,399.

(51) Int. Cl.
*G01B 7/30* (2006.01)
*G01P 13/00* (2006.01)

(52) U.S. Cl. .............. 324/165; 324/207.2; 324/207.21; 324/207.25; 324/174

(58) Field of Classification Search .......... 324/207.12, 324/207.2, 207.21, 207.24, 207.25, 207.26, 324/163–174; 338/32 R, 32 H
See application file for complete search history.

(56) References Cited

U.S. PATENT DOCUMENTS

| 3,636,767 | A |  | 1/1972 | Duffy |
| 4,293,814 | A |  | 10/1981 | Boyer |
| 4,725,776 | A |  | 2/1988 | Onodera et al. |
| 4,868,909 | A |  | 9/1989 | Lowel |
| 5,021,736 | A |  | 6/1991 | Gonsalves et al. |
| 5,192,877 | A |  | 3/1993 | Bittebierre et al. |
| 5,210,489 | A |  | 5/1993 | Petersen |
| 5,371,460 | A |  | 12/1994 | Coffman et al. |
| 5,483,162 | A |  | 1/1996 | Ushikoshi et al. |
| 5,532,583 | A |  | 7/1996 | Davis et al. |
| 5,548,242 | A |  | 8/1996 | Yasuda et al. |
| 5,596,272 | A | * | 1/1997 | Busch .................. 324/207.21 |
| 5,614,821 | A |  | 3/1997 | Leiderer |
| 5,631,618 | A |  | 5/1997 | Trumper et al. |
| 5,633,486 | A |  | 5/1997 | Burg et al. |

(Continued)

FOREIGN PATENT DOCUMENTS

DE    19630108    1/1998

(Continued)

OTHER PUBLICATIONS

U.S. Appl. No. 09/030,144, filed Feb. 25, 1998, Schroeder et al.

(Continued)

*Primary Examiner*—Jay Patidar
(74) *Attorney, Agent, or Firm*—Jimmy L. Funke

(57) ABSTRACT

A target wheel sensor assembly includes a target wheel, a magnet, and two or more sensing elements placed therebetween. The magnet and the sensing elements are configured so that as the target wheel rotates each of the sensing elements outputs a respective asymmetric signal relative to the direction of rotation of the target wheel or an object mechanically connected to the wheel. Each of these asymmetric signals is differentially combined with one another to determine the direction of motion of the target wheel, and, if optionally desired, the position of the target wheel.

17 Claims, 7 Drawing Sheets

U.S. PATENT DOCUMENTS

| | | | |
|---|---|---|---|
| 5,801,529 A | 9/1998 | Umemoto et al. |
| 6,064,198 A | 5/2000 | Wolf et al. |
| 6,087,827 A | 7/2000 | Oudet |
| 6,140,813 A | 10/2000 | Sakanoue et al. |
| 6,242,905 B1 | 6/2001 | Draxelmayr |
| 6,310,474 B1 | 10/2001 | Schroeder |
| 6,320,374 B1 | 11/2001 | Schroeder et al. |
| 6,404,188 B1 | 6/2002 | Ricks |
| 6,639,399 B1 | 10/2003 | Schroeder et al. |
| 2002/0105322 A1 | 8/2002 | Schroeder et al. |
| 2002/0180426 A1 | 12/2002 | Schroeder et al. |

FOREIGN PATENT DOCUMENTS

| | | |
|---|---|---|
| DE | 19701927 | 6/1998 |
| DE | 19814758 | 10/1999 |
| EP | 0580207 A1 | 1/1994 |

OTHER PUBLICATIONS

Patent Abstracts of Japan, vol. 097, No. 011, Nov. 28, 1997 & JP 09 197030A (Sankyo Seiki Mfg Co Ltd), Jul. 31, 1997 abstract.

Allegro Microsystems, Inc., *True Zero-Speed, Hall-Effect Adaptive Gear-Tooth Sensor, 16 pages*, Copyright 2002, Worcester, Massachusetts, (http://www.allegromicro.com/datafile/0660.pdf).

* cited by examiner

SENSOR ASSEMBLY COMBINING SIGNALS WITH ENHANCED ASYMMETRY FOR DETECTING DIRECTION OF ROTATION OF AN OBJECT

This application is a Continuation-In-Part of U.S. application Ser. No. 09/777,764 filed Feb. 6, 2001 now U.S. Pat. No. 6,639,399.

TECHNICAL FIELD

The present invention generally relates to motor vehicle sensors and actuators, and, more particularly, the present invention is directed to a sensor assembly using differential sensing elements for detecting direction of motion of a rotating object.

BACKGROUND OF THE INVENTION

Modern motor vehicles are equipped with numerous sensors that provide detailed information regarding the operation of the vehicle. This information may be displayed for a driver or it may be processed and provided to various vehicle control systems. A target wheel sensor, for example, may be used to determine the angular speed or angular position of a rotating object in the vehicle, e.g., a crankshaft and a driveshaft. In either case, a target wheel may be engaged with the rotating object for inducing signals in one or more sensors positioned next to the target wheel, with the signals representing the angular position or angular speed of the rotating object. These signals can be used in various control systems, e.g., an ignition system and a speed control system. The present invention recognizes that certain applications require the detection of not only the position of the object, but the detection of the direction of motion of the rotating object as well.

U.S. patent application Ser. No. 09/777,764 titled "Target Wheel Sensor Assembly For Determining Position And Direction Of Motion Of A Rotating Target Wheel", commonly assigned to the same assignee of the present invention and herein incorporated by reference, in part teaches how detection of direction of rotation can be obtained from an asymmetric sensor. This application focuses on designs with "one and only one sensing element". Using a single sensing element should conceptually provide a low-cost solution. In practice, however, dual sensors (e.g., Hall sensors) used in a differential mode are at the present time, essentially a commodity. Therefore, at least under the present state of affairs regarding sensor technology, dual sensors may actually constitute the lower cost solution.

In view of the foregoing, it would be desirable to extend the innovative concepts of U.S. patent application Ser. No. 09/777,764 to a sensor assembly using differential sensors (more generally, two or more sensing elements).

BRIEF SUMMARY OF THE INVENTION

A sensor assembly for detecting rotation of an object may include a target wheel, a magnet, and at least two sensing elements placed therebetween. The magnet and the sensing elements are configured so that as the target wheel rotates it causes each sensing element to output a respective asymmetric signal relative to the direction of rotation of the object. Each of the asymmetric signals may be combined (e.g., differentially combined) to generate a combined signal indicative of the direction of rotation of the object.

In one aspect of the present invention, the sensor assembly may define a central axis, and the magnet and the sensing elements may be oriented perpendicular to the central axis. In this aspect, the magnet generates a magnetic field that is oriented at an angle with the central axis. In one exemplary embodiment, the angle is in a range from about twenty degrees to about seventy degrees (20°–70°).

In another aspect of the present invention, the sensor assembly may define a central axis, and just the magnet may be oriented perpendicular to the central axis. The magnet generates a magnetic field that is oriented parallel to the central axis. In this aspect, each sensing element may be oriented at an angle with the central axis. In an exemplary embodiment, the angle is in a range from about zero degrees to about seventy degrees (0°–70°).

In yet another aspect of the present invention, the sensor assembly may define a central axis, and the magnet and the sensing elements may be oriented perpendicular to the central axis. The magnet generates a magnetic field that is oriented parallel to the central axis. In this aspect, the magnet may be centered on the central axis, and one of the sensing elements may be placed at a distance from the central axis that is different than the distance from the central axis for the other sensing element. The magnet defines a length and, in one exemplary embodiment, the distance for any of the sensing elements relative to the central axis may range from about forty percent to about one hundred percent (40%–100%) of one-half of the length.

In yet still another aspect of the present invention, the sensor assembly may define a central axis. The magnet may define a longitudinal axis and generate a magnetic field that is oriented perpendicular to the longitudinal axis. Moreover, each sensing element may be oriented parallel to the longitudinal axis of the magnet. In this aspect, the magnet and the sensing elements may be oriented at an angle with the central axis. In one exemplary embodiment, the angle may range from about one degree to about forty degrees (1°–40°).

In another aspect of the present invention, the sensor assembly may include a magnetic piece placed near the magnet. The magnetic piece is configured so that as the target wheel rotates, it causes each sensing element to supply an asymmetric output signal.

In still another aspect of the present invention, the sensor assembly may define a central axis. In this aspect, the magnet defines a lower surface that is oriented perpendicular to the central axis and an upper surface that is oriented at an angle with the central axis.

In yet another aspect of the present invention, the magnet may be configured to generate a first magnetic field and a second magnetic field. In one exemplary embodiment, the magnetic fields have different strengths relative to one another. In another embodiment, the magnetic fields may have a mutually orthogonal direction relative to one another.

In yet still another aspect of the present invention, a target wheel sensor assembly may include a target wheel, a magnet may be placed near the target wheel, and at least two sensing elements may be placed between the target wheel and the magnet. In this aspect, each sensing element produces a respective output signal, which may be differentially combined with one another to supply a combined output signal indicative of a direction of rotation of the target wheel and/or the position of the target wheel.

BRIEF DESCRIPTION OF THE DRAWINGS

Exemplary aspects of the present invention will now be described with reference to the accompanying drawings, in which:

FIG. 12B shows an exemplary signal that results when differentially combining the individual signals of FIG. 12A.

DETAILED DESCRIPTION OF THE INVENTION

Figure 1:
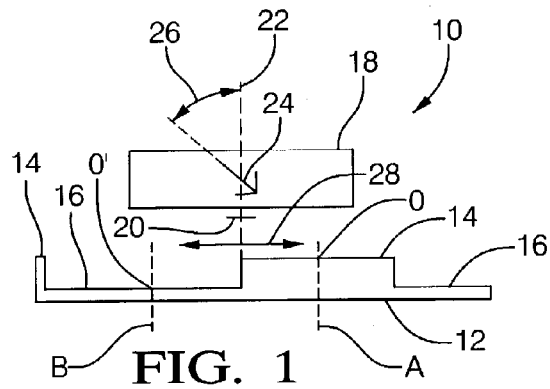
FIG. 1 is a plan view of an exemplary target wheel sensor assembly using a single sensing element.

Referring initially to FIG. 1, a target wheel sensor assembly is shown and generally designated 10. FIG. 1 shows that the sensor assembly 10 includes a preferably magnetic target wheel 12 that is alternatingly formed with plural teeth 14 and plural slots 16. A preferably permanent magnet 18 is placed just beyond the outer periphery of the target wheel 12. Moreover, a sensing element 20, e.g., a Hall sensor or magnetoresistor (MR), is placed between the target wheel 12 and the magnet 18.

As shown in FIG. 1, the sensor assembly 10 defines a central axis 22 with which the center of the magnet 18, the center of the sensing element 20, and the center of the target wheel 12 are aligned. Moreover, the magnet 18 and the sensing element 20 are placed so that they are perpendicular to the central axis 22. FIG. 1 shows that the magnet 18 generates a magnetic field as indicated by arrow 24. As shown, the magnet 18 is magnetized such that the magnetic field 24 is at an angle 26 with the central axis 22. In a preferred embodiment, the angle of magnetization 26 is in a range from twenty degrees to seventy degrees (20°–70°).

As the target wheel 12 rotates, the teeth 14 move past the sensing element 20, as indicated by direction arrow 28, and alter the magnetic field 24 sensed by the sensing element 20. Accordingly, the configuration of the sensor assembly 10, i.e., the angle of magnetization 26 of the magnet 18, causes the sensing element 20 to output an asymmetric signal relative to the direction of rotation of the target wheel or an object mechanically connected to the target wheel, as described below.

Figure 2:
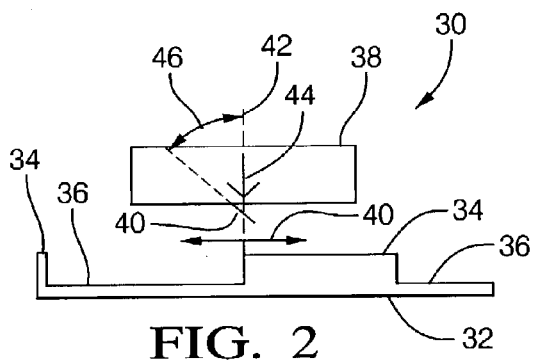
FIG. 2 is a plan view of a first alternative sensor assembly.

FIG. 2 shows a first alternative target wheel sensor assembly generally designated 30. As shown in FIG. 2, the sensor assembly 30 includes a magnetic target wheel 32 that is alternatingly formed with plural teeth 34 and plural slots 36. A permanent magnet 38 is placed just beyond the outer periphery of the target wheel 32. Moreover, a sensing element 40, e.g., a Hall sensor or magnetoresistor (MR), is placed between the target wheel 32 and the magnet 38.

As shown in FIG. 2, the sensor assembly 30 defines a central axis 42 with which the center of the magnet 38, the center of the sensing element 40, and the center of the target wheel 32 are aligned. Moreover, the magnet 38 is placed so that it is perpendicular to the central axis 42. FIG. 2 shows that the magnet 38 generates a magnetic field as indicated by arrow 44. As shown, the magnet 18 is magnetized such that the magnetic field 44 is parallel to the central axis 42. The sensing element 40 is placed so that it defines an angle 46 with the central axis 42 and the magnetic field 44. Preferably, the sensing element angle 46 is in a range from zero degrees to seventy degrees (0°–70°).

As the target wheel 32 rotates, the teeth 34 move past the sensing element 40, as indicated by direction arrow 48, and alter the magnetic field 44 sensed by the sensing element 40. Accordingly, the configuration of the sensor assembly 30, i.e., the placement of the sensing element 40 at an angle 46 with the magnetic field 44, causes the sensing element 40 to output an asymmetric signal, described below.

Figure 3:
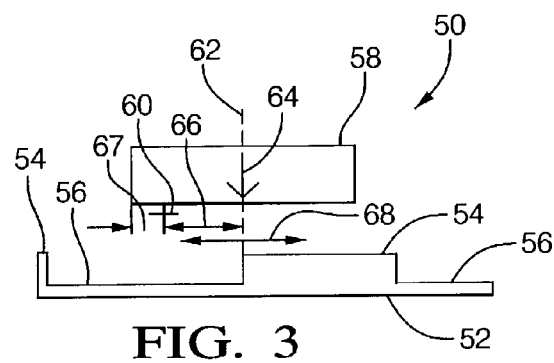
FIG. 3 is a plan view of a second alternative sensor assembly.

Referring now to FIG. 3, a second alternative sensor is shown and generally designated 50. FIG. 3 shows that the sensor assembly 50 includes a magnetic target wheel 52 that is alternatingly formed with plural teeth 54 and plural slots 56. A permanent magnet 58 is placed just beyond the outer periphery of the target wheel 52. Moreover, a sensing element 60, e.g., a Hall sensor or magnetoresistor (MR), is placed between the target wheel 52 and the magnet 58.

As shown in FIG. 3, the sensor assembly 50 defines a central axis 62 with which the center of the magnet 58 and the center of the target wheel 12 are aligned. Moreover, the magnet 58 is placed so that it is perpendicular to the central axis 62. FIG. 3 shows that the magnet 58 generates a magnetic field as indicated by arrow 64. The sensing element 60 is placed so that its center is offset from the center of the magnet 58. More specifically, the center of the sensing element 60 is located a distance 66 from the center of the magnet 64 and a distance 67 from the edge of the magnet 64. Preferably, the distance 66 from the center of the magnet is in a range from forty percent to one hundred percent (40%–100%) of half the length of the magnet 58. In this embodiment of the sensor assembly 50, the preferred length of the magnet is at least five millimeters (5 mm).

As the target wheel 52 rotates, the teeth 54 move past the sensing element 60, as indicated by direction arrow 68, and alter the magnetic field 64 sensed by the sensing element 60. Accordingly, the configuration of the sensor assembly 50, i.e., the placement of the sensing element 60 so that its center is offset from the center of the magnet 58, causes the sensing element 60 to output an asymmetric signal, described below.

Figure 4:
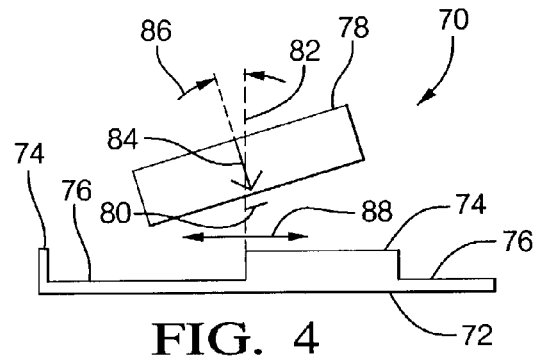
FIG. 4 is a plan view of a third alternative sensor assembly.

FIG. 4 shows yet a third alternative sensor generally designated 70. As shown in FIG. 4, the sensor assembly 70 includes a magnetic target wheel 72 that is alternatingly formed with plural teeth 74 and plural slots 76. A permanent magnet 78 is placed just beyond the outer periphery of the target wheel 72. Moreover, a sensing element 80, e.g., a Hall sensor or magnetoresistor (MR), is placed between the target wheel 72 and the magnet 78.

As shown in FIG. 4, the sensor assembly 70 defines a central axis 82 with which the center of the magnet 78 and the center of the target wheel 72 are aligned. FIG. 4 shows that the magnet 18 generates a magnetic field, as indicated by arrow 24 that is perpendicular to the length of the magnet 78. The sensing element 80 is placed so that it is parallel to the length of the magnet 78. As shown, the magnet 78 and the sensing element 80 are placed at an angle 86 with the central axis 22. In a preferred embodiment, the placement angle 86 is in a range from one degree to forty degrees (1°–40°).

As the target wheel 72 rotates, the teeth 74 move past the sensing element 80, as indicated by direction arrow 88, and alter the magnetic field 84 sensed by the sensing element 80. Accordingly, the configuration of the sensor assembly 70, i.e., the placement angle 86 of the magnet 78 and the sensing element 80 with respect to the central axis 86, causes the sensing element 80 to output an asymmetric signal, described below.

Figure 5:
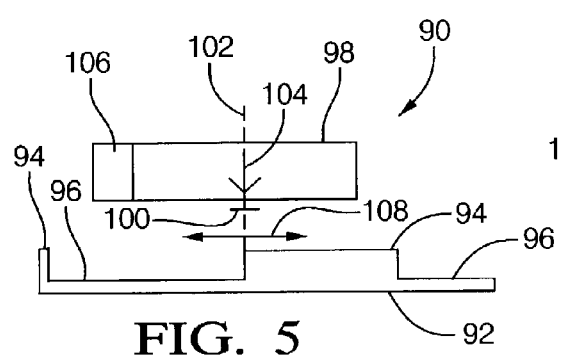
FIG. 5 is a plan view of a fourth alternative sensor assembly.

Referring now to FIG. 5, a fourth alternative of the target wheel sensor assembly is shown and generally designated 90. FIG. 5 shows that the sensor assembly 90 includes a magnetic target wheel 92 that is alternatingly formed with plural teeth 94 and plural slots 96. A permanent magnet 98 is placed just beyond the outer periphery of the target wheel 92. Moreover, a sensing element 100, e.g., a Hall sensor or magnetoresistor (MR), is placed between the target wheel 92 and the magnet 98.

As shown in FIG. 5, the sensor assembly 90 defines a central axis 102 with which the center of the magnet 98, the center of the sensing element 100, and the center of the target wheel 92 are aligned. Moreover, the magnet 98 and the sensing element 100 are placed so that they are perpendicular to the central axis 102. FIG. 5 shows that the magnet 98 generates a magnetic field, as indicated by arrow 104 that is parallel to the central axis 102. As shown, the magnet 98 is flanked on one edge by a preferably steel, magnetic piece 106 having a generally rectangular cross-section.

As the target wheel 92 rotates, the teeth 94 move past the sensing element 100, as indicated by direction arrow 108, and alter the magnetic field 104 sensed by the sensing element 100. Accordingly, the configuration of the sensor assembly 90, i.e., the magnetic piece 106 that flanks the magnet 98, alters the return path of the magnetic field 104 and causes the sensing element 100 to output an asymmetric signal, described below.

Figure 6:
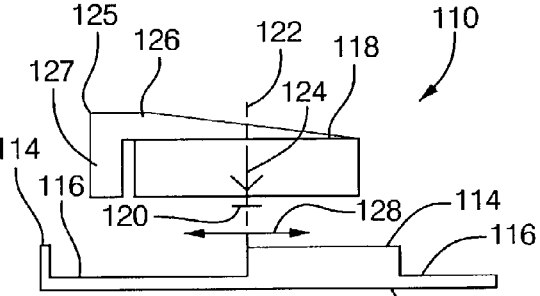
FIG. 6 is a plan view of a fifth alternative sensor assembly.

FIG. 6 shows a fifth alternative target wheel sensor assembly generally designated 110. As shown in FIG. 6, the sensor assembly 110 includes a magnetic target wheel 112 that is alternatingly formed with plural teeth 114 and plural slots 116. A permanent magnet 118 is placed just beyond the outer periphery of the target wheel 112. Moreover, a sensing element 120, e.g., a Hall sensor or magnetoresistor (MR), is placed between the target wheel 112 and the magnet 118.

As shown in FIG. 6, the sensor assembly 110 defines a central axis 122 with which the center of the magnet 118, the center of the sensing element 120, and the center of the target wheel 112 are aligned. Moreover, the magnet 118 and the sensing element 120 are placed so that they are perpendicular to the central axis 122. FIG. 6 shows that the magnet 118 generates a magnetic field, indicated by arrow 24 that is parallel to the central axis 122. As shown, a magnetic piece 125, that includes an upper portion 126 and a lateral portion 127 extending therefrom, is placed around the magnet 118. Preferably, the upper portion 126 of the magnetic piece 125 is tapered. Moreover, the lateral portion has a generally rectangular cross-section. The tapered upper portion 126 is placed adjacent to the top of the magnet 118 and the lateral portion 127 flanks one side of the magnet 118.

As the target wheel 112 rotates, the teeth 114 move past the sensing element 120, as indicated by direction arrow 128, and alter the magnetic field 124 sensed by the sensing element 120. Accordingly, the configuration of the sensor assembly 10, i.e., the magnetic piece 125 placed around the magnet, causes the sensing element 120 to output an asymmetric signal, described below. More specifically, the magnetic piece 125 alters the return path of the magnetic field 124, which causes the sensing element 120 to output the asymmetric signal.

Figure 7:
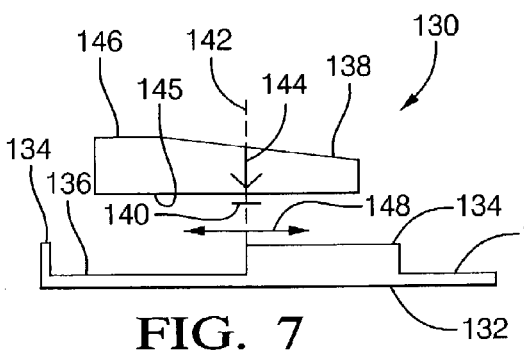
FIG. 7 is a plan view of a sixth alternative sensor assembly.

FIG. 7 shows still a sixth alternative target wheel sensor assembly generally designated 130. As shown in FIG. 7, the sensor assembly 130 includes a magnetic target wheel 132 that is alternatingly formed with plural teeth 134 and plural slots 136. A permanent magnet 138 is placed just beyond the outer periphery of the target wheel 132. Moreover, a sensing element 140, e.g., a Hall sensor or magnetoresistor (MR), is placed between the target wheel 132 and the magnet 138.

As shown in FIG. 7, the sensor assembly 130 defines a central axis 142 with which the center of the magnet 138, the center of the sensing element 140, and the center of the target wheel 132 are aligned. The magnet 138 generates a magnetic field, indicated by arrow 144 that is parallel to the central axis 142. FIG. 7 shows that the magnet 138 defines a lower surface 145 that is perpendicular to the central axis 142 and an upper surface 146 that is at an angle with respect to the lower surface 145 and the central axis 142. Thus, as shown, the magnet 138 is tapered from one end to the other.

As the target wheel 132 rotates, the teeth 134 move past the sensing element 140, as indicated by direction arrow 148, and alter the magnetic field 144 sensed by the sensing element 140. Accordingly, the configuration of the sensor assembly 130, i.e., the tapered shape of the magnet 138, causes the sensing element 140 to output an asymmetric signal, described below.

Figure 8:
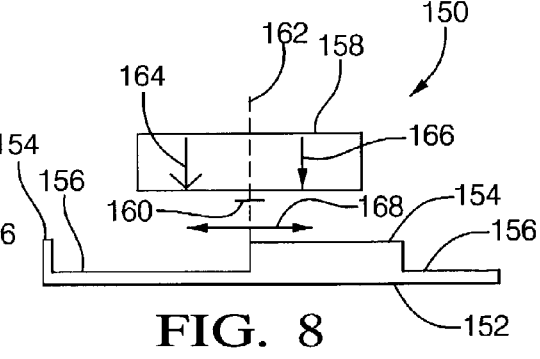
FIG. 8 is a plan view of a seventh alternative sensor assembly.

Referring to FIG. 8, a seventh alternative target wheel sensor assembly is shown and generally designated 150. FIG. 8 shows that the sensor assembly 150 includes a magnetic target wheel 152 that is alternatingly formed with plural teeth 154 and plural slots 156. A permanent magnet 158 is placed just beyond the outer periphery of the target wheel 152. Moreover, a sensing element 160, e.g., a Hall sensor or magnetoresistor (MR), is placed between the target wheel 152 and the magnet 158.

As shown in FIG. 8, the sensor assembly 150 defines a central axis 162 with which the center of the magnet 158, the center of the sensing element 160, and the center of the target wheel 152 are aligned. Moreover, the magnet 158 and the sensing element 160 are placed so that they are perpendicular to the central axis 162. FIG. 8 shows that the magnet 158 generates a relatively strong magnetic field to one side of the central axis 162, indicated by arrow 164, and a relatively weak magnetic field to the other side of the central axis 162, indicated by arrow 166. As shown, the magnet 158 is magnetized so that the magnetic fields 164, 166 are parallel to the central axis 162. It is to be appreciated that the differing magnetic fields 164, 166 may be produced, e.g., by an ad hoc magnetization process or by selectively demagnetizing a normally magnetized magnet. Such a partial demagnetization can be achieved, e.g., by local heating of the magnet material with a laser beam or other means.

As the target wheel 152 rotates, the teeth 154 move past the sensing element 160, as indicated by direction arrow 168, and alter the magnetic fields 164, 166 sensed by the sensing element 160. Accordingly, the configuration of the sensor assembly 150, i.e., the differing strengths of the magnetic fields 164, 166 produced by the magnet 158, causes the sensing element 160 to output an asymmetric signal, described below.

Figure 9:
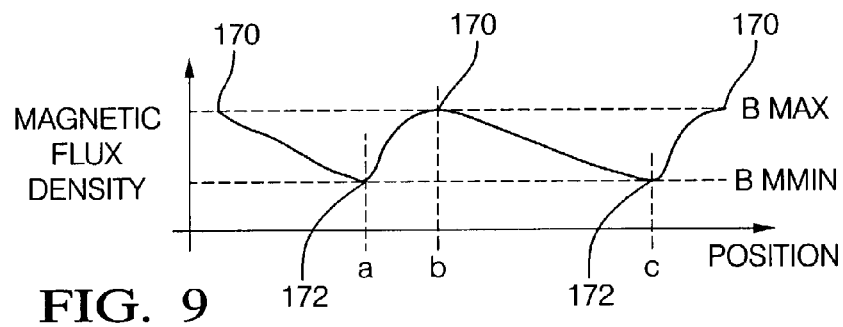
FIG. 9 is a graph of an exemplary magnetic flux density that may be used for detecting direction of rotation of an object.

FIG. 9 shows a graph, applicable to each sensor assembly described above, of the magnetic flux density sensed by the sensing element 20, 40, 60, 80, 100, 120, 140, 160 versus the position of the target wheel 12, 32, 52, 72, 92, 112, 132, 152. FIG. 9 shows that the magnetic flux density asymmetrically cycles between a maximum value 170 and a minimum value 172 without crossing the zero axis. As shown, the slope of the graph leading to the maximum value 170 and the slope of the graph leading to the minimum value 172 are distinctly different. Thus, the configuration of sensor assembly 10, 30, 50, 70, 90, 110, 130, 150 causes the sensing element 20, 40, 60, 80, 100, 120, 140, 160 to produce an output that is asymmetric. More particularly, the physical basis of such a sensor assembly is based on creating physical asymmetry with respect to the direction of rotational travel of the target wheel, in order to detect this direction of travel. By way of example, this asymmetry could be defined with respect to an exemplary plane A (FIGS. 1 and 11) that bisects the center of a tooth, or with respect to an exemplary plane B (FIGS. 1 and 11) that bisects the center of a slot. Mathematically, this signal exhibits asymmetry with respect to the center of the tooth (point O in FIGS. 1 and 11), or with respect to the center of the slot (point O' in FIGS. 1 and 11). In general, the asymmetric signal produced by a sensor assembly embodying aspects of the present invention is not an even function with respect to any point along such a signal. This asymmetric signal can be used to not only determine the position of the target wheel 14, but also its direction of motion.

Figure 10:
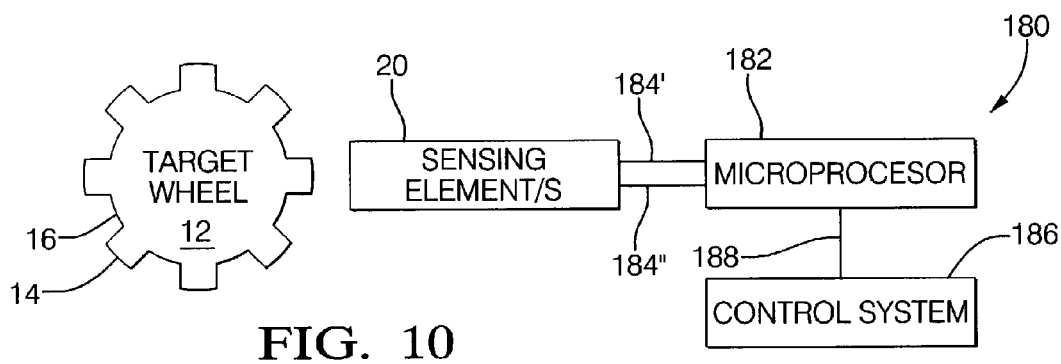
FIG. 10 is a block diagram of an exemplary system in which aspects of the present invention can be incorporated.

Referring now to FIG. 10, a system in which the present invention can be incorporated is shown and generally designated 180. FIG. 10 shows that the system includes a target wheel, e.g., the target wheel 12 shown in FIG. 1 and described above, and a sensing element, e.g., the sensing element 20 shown in FIG. 1 and described above, or in the case of a differential sensor assembly at least two sensing elements, as will be described in the context of FIGS. 11 through 23. The output signal from sensing element 20 may be connected to a microprocessor 182 via an electric line 184' or in the case of a differential sensor assembly through a pair of electric lines 184' and 184". In turn, the microprocessor 182 is connected to a control system 186 by electric line 188. Accordingly, the microprocessor 182 receives an asymmetric signal from the sensing element 20 (or two asymmetric signals in the case of a differential sensor) and determines the position of the target wheel 12 and its direction of motion based thereon.

As shown in FIG. 9, the slope of the asymmetric signal is distinctly different on one side of a peak or a valley (e.g., a maximum value represented by point a and a minimum value represented by point b) than it is on the other side of a peak. The microprocessor 182 can use the different slopes to determine the direction of motion. For example, the microprocessor 182 can determine the direction of rotation by measuring the time required for the amplitude of the asymmetric signal to change by a predetermined value. The position can be determined by simply counting the peaks. The microprocessor 182 can then output a signal representing the position of the target wheel and the direction of motion of the target wheel to the control system 186.

With the configuration of structure described above, it is to be appreciated that the target wheel sensor assembly 10, 30, 50, 70, 90, 110, 130, 150 can be used to determine the position and direction of motion of a rotating target wheel 12, 32, 52, 72, 92, 112, 132, 152 using only a single sensing element 20, 40, 60, 80, 100, 120, 140, 160. It is also to be appreciated that several of the embodiments described above can be combined with other embodiments described above to yield a target wheel sensor assembly that outputs an asymmetric signal relative to the direction of travel of a rotating object. For example, features of the embodiment shown in FIG. 1 may be combined with features of the embodiment shown in FIG. 2 to yield another target wheel sensor assembly.

The description provided so far shows various embodiments using a single sensing element for detecting the direction of rotation of a rotating object. The description will now show that these concepts may be advantageously extended to differential sensing elements, as may be integrated in a common die. The inventors of the present invention have innovatively recognized that integrated circuit dies comprising dual sensors (e.g., Hall sensors), as may be used in a differential mode just for sensing angular position, are presently a commodity. Therefore, differential sensors may actually provide a relatively low cost solution that includes all of the benefits of common mode rejection and improved signal-to-noise ratio over a single sensing element.

When two sensing elements are appropriately arranged relative to one another, each of such elements may produce respective signals that are displaced in time with respect to one another. For example, the signals may be in quadrature relative to one another (e.g., displaced in space by a fourth of the tooth pitch). Extracting direction of rotation from two signals in quadrature (or, more generally, displaced in time from one another by a known amount) would be a fairly straightforward task. One possible disadvantage of this technique, however, may be the possibility of erroneous indication of rotation during target vibration or dithering at standstill. This disadvantage would be avoided by using a differential sensor assembly in accordance with aspects of the present invention.

An aspect of the present invention comprises the use of at least two sensing elements. When their signals are combined by subtraction, one would get the advantage of rapid position detection as well as detection of the direction of rotation, if so desired. Furthermore, a differential sensor assembly embodying aspects of the present invention may take advantage of using integrated circuit packages that commonly may not be modifiable since such circuits are typically configured or pre-packaged to obtain just quadrature signals. Thus, the present invention innovatively recognizes a new use of a circuit traditionally used in the art for quadrature detection techniques.

Figure 11:
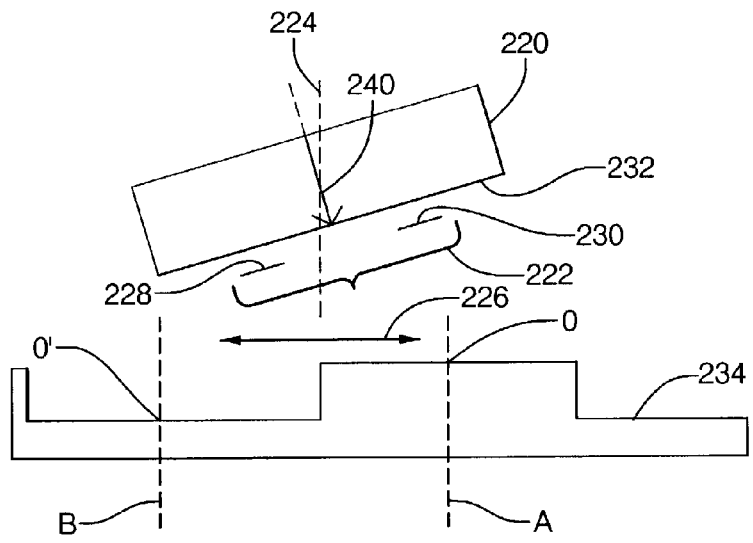
FIG. 11 is a plan view of an exemplary sensor assembly including a differential sensor for detecting direction of rotation of an object and/or rotational position of the object, if so desired.
Figure 12:
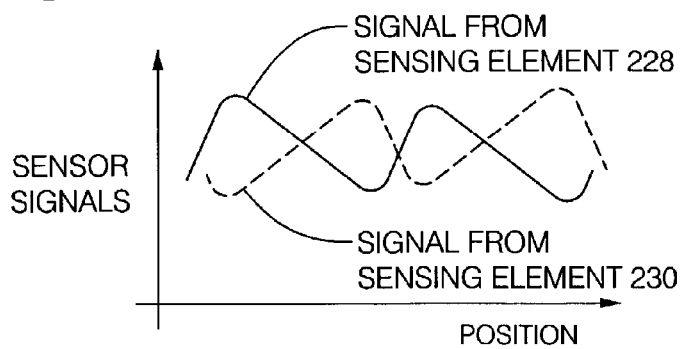
FIG. 12, made up of FIGS. 12A and 12B, shows exemplary signals from a differential sensor. The individual signals are shown in FIG. 12A
Figure 12:
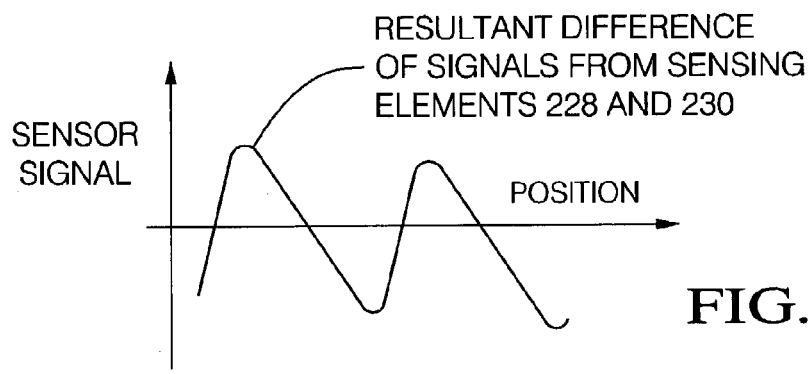
Figure 13:
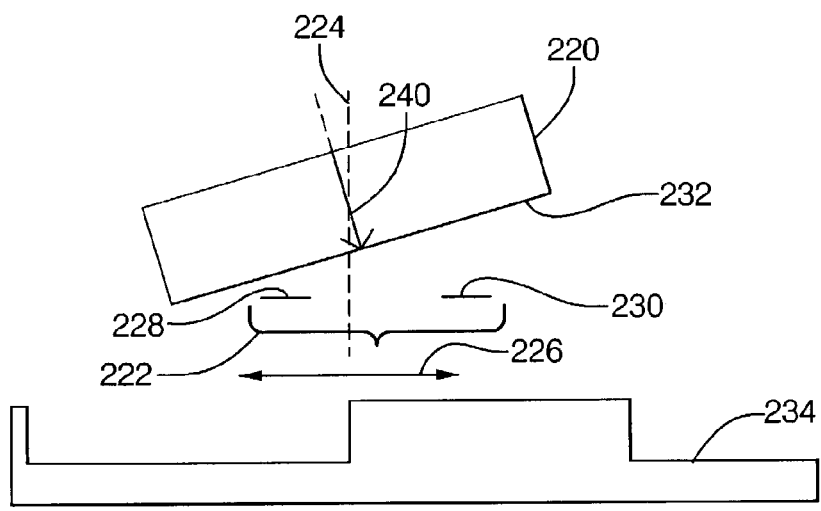
FIG. 13 is a plan view of a first variation of the differential sensor assembly of FIG. 11.

In one exemplary embodiment shown in FIG. 11, the asymmetry of the sensor assembly relative to the direction of angular travel of a rotating object may be produced by tilting both a permanent magnet 220 and a differential sensor 222 with respect to an axis 224 (e.g., a central axis) perpendicular to the direction of motion represented by double-headed arrow 226. The magnet 220 may define a longitudinal axis 225 and may generate a magnetic field that is oriented perpendicular to the longitudinal axis. Each of the sensing elements may be oriented parallel to the longitudinal axis of the magnet. The sensor 222 in one exemplary embodiment comprises a differential sensor made up of two Hall-sensing elements 228 and 230 placed parallel relative to a lower surface 232 of the magnet. It will be appreciated that other galvanomagnetic sensing devices, such as magnetoresistive sensing elements, may be used in lieu of the Hall-sensing elements. Sensing elements 228 and 230 may also be symmetrically placed relative to the lateral edges of the magnet.

Figure 14:
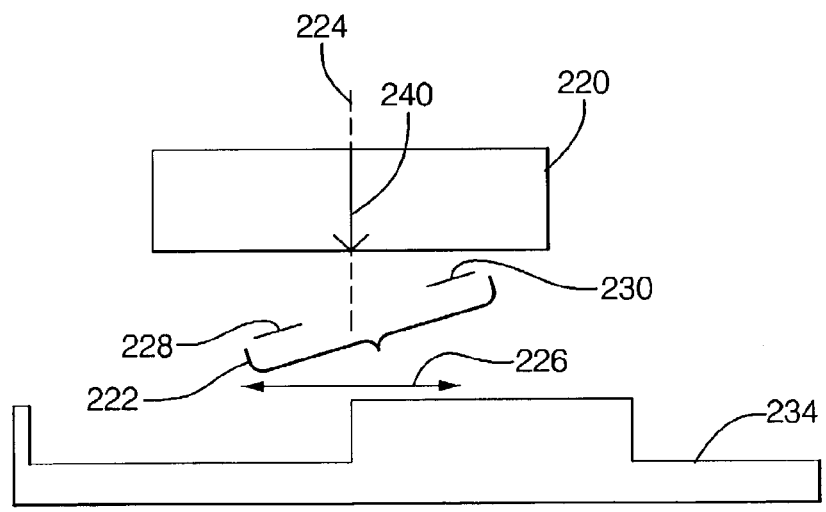
FIG. 14 is a plan view of a second variation of the differential sensor assembly of FIG. 11.

Typical signals from sensors 228 and 230 are shown in FIG. 12A. It will be appreciated that such signals exhibit different slopes, or other characteristics that can be used to detect the direction of rotation of a rotating object (e.g., a target wheel 234 or any object mechanically connected to the target wheel). Differentially combining both signals yields a signal that is asymmetric with respect to direction of rotation, as seen in FIG. 12B. The combination of both signals, therefore, can be used to detect direction of rotation. Examples of possible combinations include computing the difference between the two signals or using one signal to trigger the other, etc. Variations of this embodiment for achieving signal asymmetry include tilting the magnet only (FIG. 13), or tilting the sensing elements only (FIG. 14).

Figure 15:
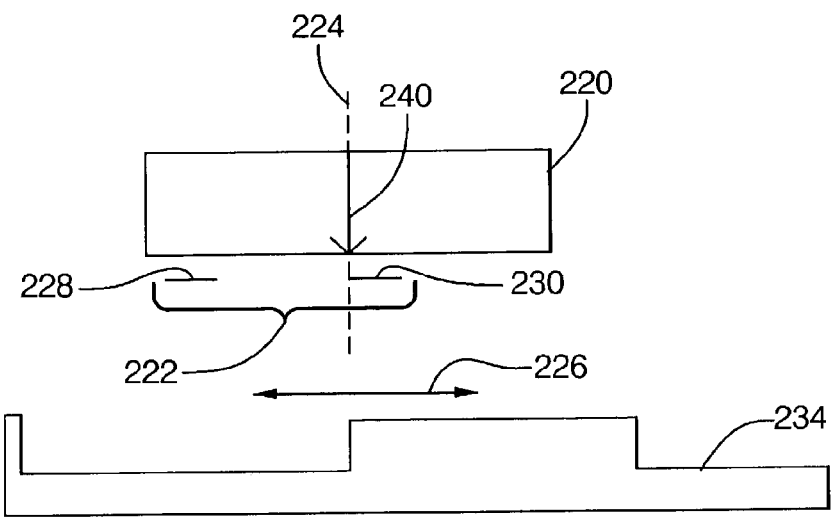
FIG. 15 is a plan view of a third variation of the differential sensor assembly of FIG. 11.
Figure 16:
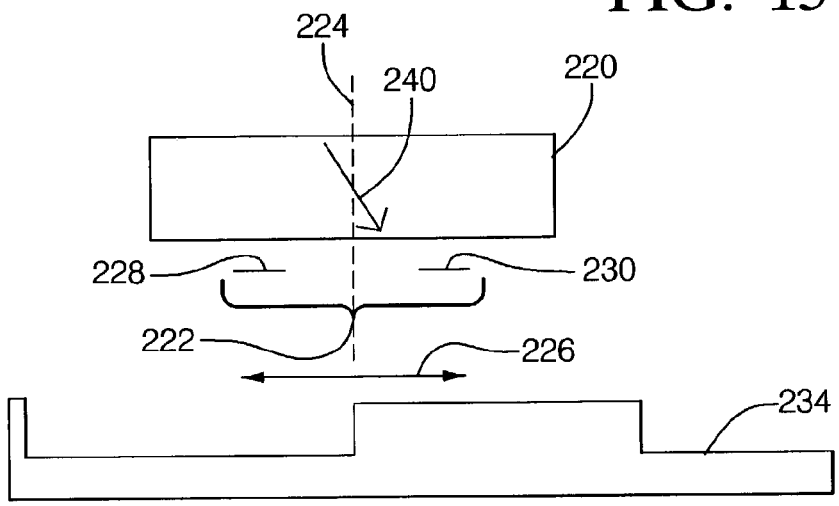
FIG. 16 is a plan view of a fourth variation of the differential sensor assembly of FIG. 11.

An exemplary configuration where the differential sensing element 222 is placed asymmetrically on magnet surface 232 relative to the lateral edges of the magnet is shown in FIG. 15. That is, one of the sensing elements may be placed at a distance from the central axis that is different than the distance from the central axis for the other sensing element.

Figure 17:
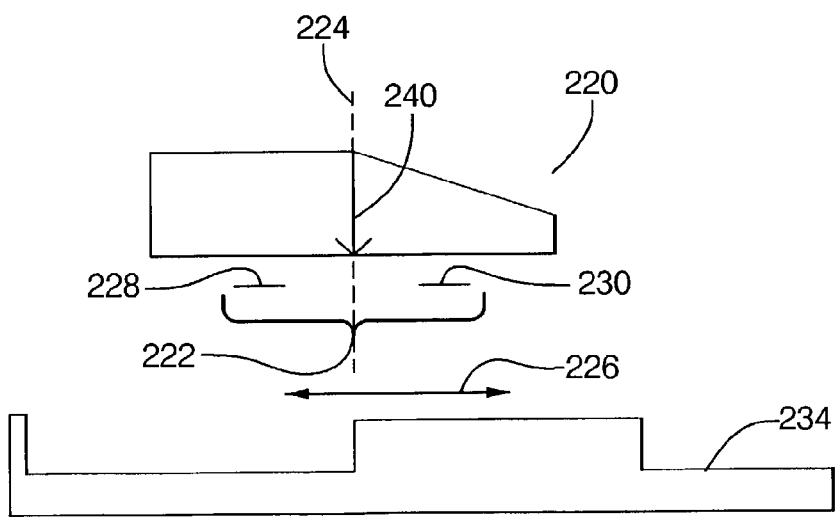
FIG. 17 is a plan view of a fifth variation of the differential sensor assembly of FIG. 11.
Figure 18:
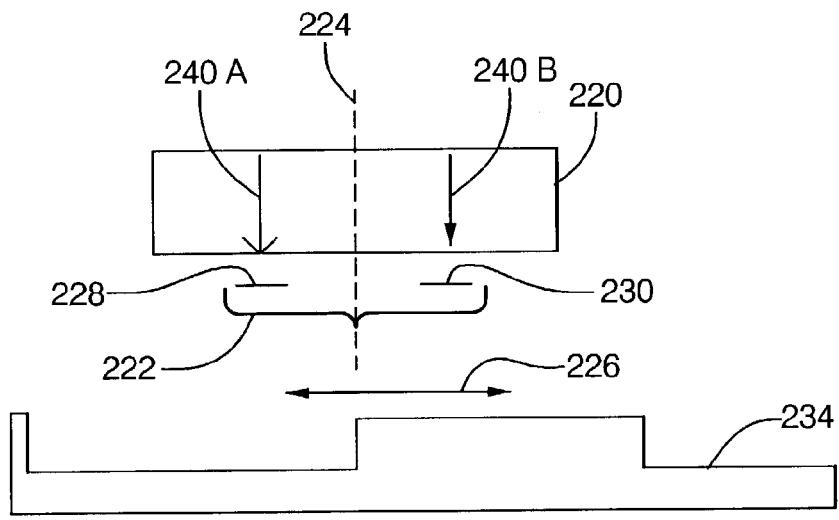
FIG. 18 is a plan view of a sixth variation of the differential sensor assembly of FIG. 11.
Figure 19:
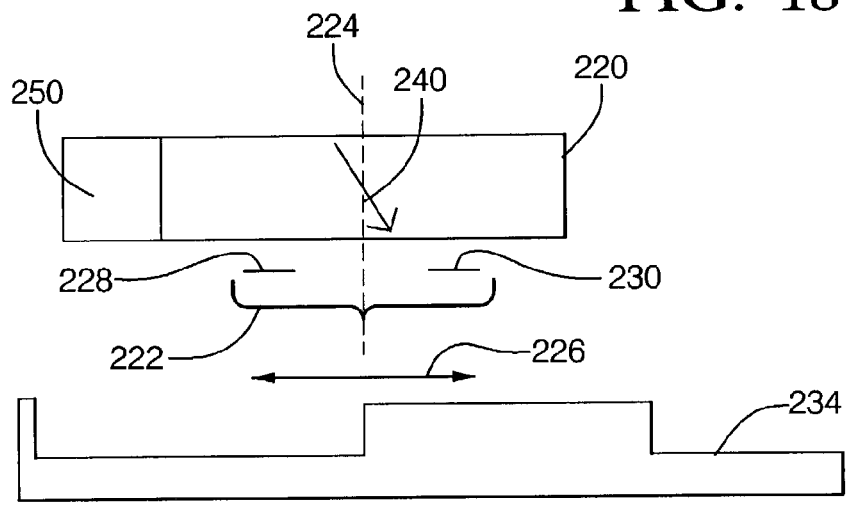
FIG. 19 is a plan view of a seventh variation of the differential sensor assembly of FIG. 11.
Figure 24:
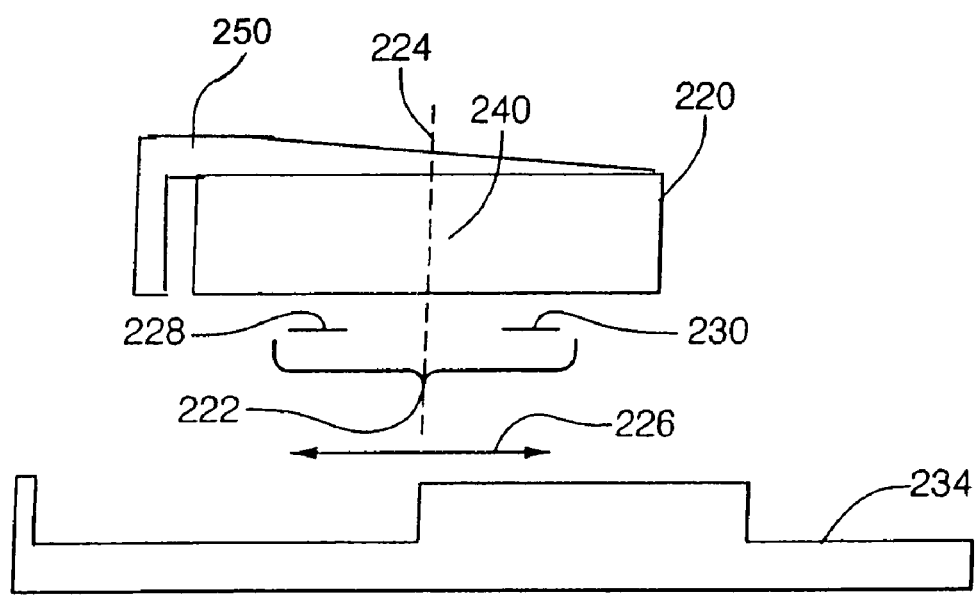
FIG. 24 is a plan view of another variation of the differential sensor assembly of FIG. 11.

The flux necessary for the detection of position and/or position direction is created by permanent magnet 220. The flux passes through the air gap between the magnet and the target wheel and returns through the back of the magnet. Some exemplary embodiments construct this flux path in asymmetric manner relative to the direction of travel of the rotating object. This may include: tilting the magnetization direction of the magnet, as represented by tilted arrow 240 in FIG. 16; shaping the magnet asymmetrically as shown in FIG 17; magnetizing the magnet 220 with magnet segments of different strength, as represented by arrows 240A and 240 B in FIG. 18; or using an asymmetrically placed magnetic piece 250 in FIG. 19. The magnetic piece may be made of steel and may have, in one exemplary embodiment, a generally rectangular cross-section for flanking one side of the magnet and altering the return path of the magnetic field and causing each sensing element to output a signal exhibiting asymmetry relative to the direction of travel of the rotating object. In another exemplary embodiment, the magnetic piece 250 may include a tapered upper portion, as illustrated in FIG. 24.

Figure 20:
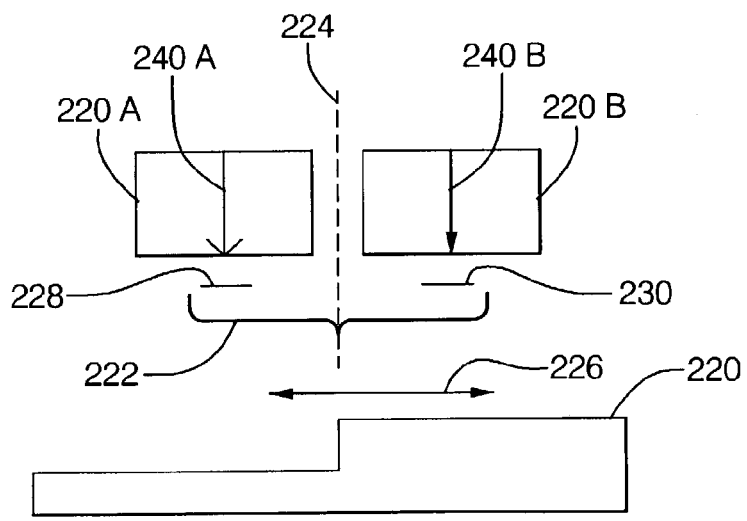
FIG. 20 is a plan view of an eighth variation of the differential sensor assembly of FIG. 11.
Figure 21:
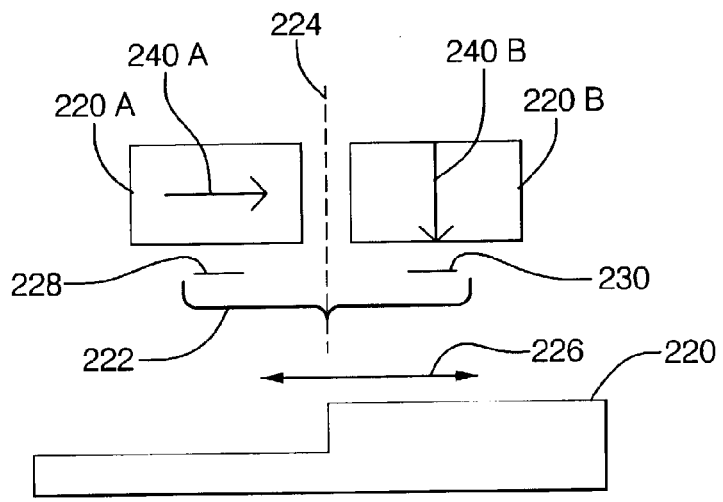
FIG. 21 is a plan view of a ninth variation of the differential sensor assembly of FIG. 11.

It is contemplated that, in order to produce an asymmetric flux path relative to the direction of travel of the rotating object, one may use two physically distinct permanent magnets, e.g., magnets 220A and 220B, as shown in FIG. 20. These two magnets together may then produce the effect of a tilted magnetization, or of segmented magnetization with different strengths. In FIG. 21, for instance, a "Halbach array" formation is depicted which produces the tilted magnetization effect. Exemplary dimensional ranges for the differential sensor assembly may be as described in the context of a single sensor assembly, and for the sake of sparing the reader from unnecessary repetition such dimensional ranges will not be repeated here. It will be appreciated that each of the above arrangements may be used in combination with one another to obtain further asymmetry enhancement, if optionally desired.

The various asymmetric magnet/sensing element assemblies described generate magnetic flux density waveforms with asymmetric patterns relative to the direction of travel of the rotating object. The asymmetric patterns may typically comprise one of two possible patterns:

1) Asymmetric Slopes:

If the magnetic flux density pattern has a steep slope on one side of a wheel tooth and a relatively less steep slope on the other side of the tooth, an exemplary pattern may be as shown in FIG. 9. Then, if the wheel is rotating clockwise, the rising edge of the signal may have a steep slope and the falling edge may have a less steep slope (or vice-versa).

An exemplary electronic circuit useful in comparing the slope variation of the waveform in order to detect the direction of rotation is described in the context of FIG. 8 of U.S. patent application Ser. No. 09/873,871, titled "A Target Wheel Sensor Assembly For Producing An Asymmetric Signal And For Determining The Direction Of Motion Of The Target Wheel Based On The Signal Shape," commonly assigned to the same assignee of the present invention and herein incorporated by reference.

Figure 22:
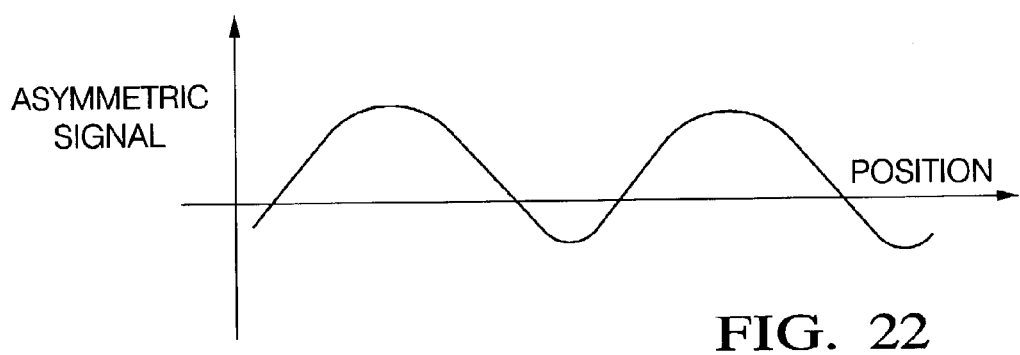
FIG. 22 illustrates an exemplary asymmetric signal with distinct positive and negative peaks.

2) Asymmetric Peaks:

One contemplates at least two variations of this pattern. First, the asymmetric peaks may be positive and negative peaks of different magnitude relative to the direction of travel of the rotating object, as shown in FIG. 22. An exemplary electronic circuit useful for comparing the positive and negative signal peaks of the waveform to detect the direction of rotation is described in the context of FIG. 5 of U.S. patent application Ser. No. 09/873,871.

Figure 23:
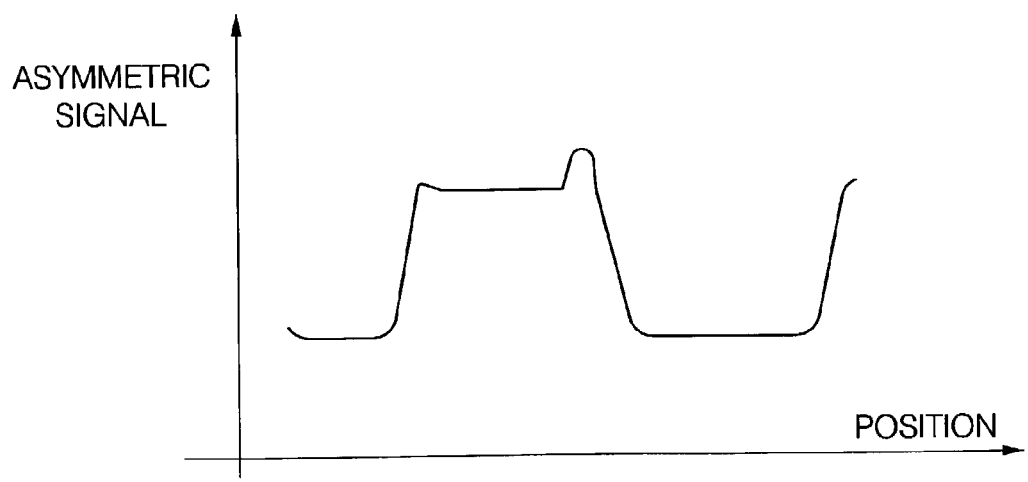
FIG. 23 illustrates an exemplary asymmetric signal with peak variation at the edges of an otherwise flat plateau.

Second, as will be appreciated by those skilled in the art, the presence of a wheel tooth generally results in a signal having a generally flat and wide plateau over the span of the tooth. In some instances, due to non-linearities in the formation of the magnetic field, the magnetic field waveform may surge and peak above the level of the flat plateau, for example, at least at one of the edges of such a plateau. An asymmetric sensor assembly can be designed to produce one relatively large peak at one edge of the plateau and one small (or essentially zero) peak at the other edge of the plateau. An exemplary pattern is shown in FIG. 23. Then, for example, if the wheel is rotating clockwise, the rising edge of the signal may correspond to the absence of a peak at the edge (or the presence of a smaller peak) while the falling edge may be preceded by a larger peak at the edge of the plateau (or vice-versa). The above-referenced electronic circuit described in the context of FIG. 5 of U.S. patent application Ser. No. 09/873,871 could also be used in this embodiment to detect such different signal peaks at each edge of the plateau. It will be appreciated by those skilled in the art that the foregoing electronic circuits need not be hardware-based circuits, since their respective functionality could be implemented equally effective in a software-based solution as may be implemented in a microprocessor, as previously set forth in the context of FIG. 10.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A sensor assembly for detecting direction of rotation of an object, comprising:
   a magnet having opposite poles and defining a center substantially midway between the poles, the center of the magnet being positioned along a central axis of the sensor assembly;
   a target wheel mechanically connected to the object; and
   at least two sensing elements placed between the target wheel and the magnet, the magnet and sensing elements being configured so that as the target wheel rotates it causes each sensing element to output respective asymmetric signals relative to the direction of rotation of the object in response to sensing structure on the target wheel, each of said asymmetric signals being differentially combined to generate a combined signal indicative of the direction of rotation of the object, wherein the magnet and the sensing elements are oriented perpendicular to the central axis, and wherein the magnet generates a magnetic field that is oriented at an angle relative to the central axis.

2. The sensor assembly of claim 1, wherein the angle comprises a range of about twenty degrees to about seventy degrees.

3. A sensor assembly for detecting direction of rotation of an object, comprising:
   a magnet having opposite poles and defining a center substantially midway between the poles, the center of the magnet being positioned alone a central axis of the sensor assembly;
   a target wheel mechanically connected to the object; and
   at least two sensing elements placed between the target wheel and the magnet, the magnet and sensing elements being configured so that as the target wheel rotates it causes each sensing element to output respective asymmetric signals relative to the direction of rotation of the object in response to sensing structure on the target wheel, each of said asymmetric signals being differentially combined to generate a combined signal indicative of the direction of rotation of the object, wherein the magnet further defines a longitudinal axis and generates a magnetic field that is oriented perpendicular to the longitudinal axis, each of the sensing elements being oriented parallel to the longitudinal axis of the magnet, and wherein the magnet and each of the sensing elements is oriented at an angle relative to the central axis.

4. The sensor assembly of claim 3, wherein the angle comprises a range from about one degree to about forty degrees.

5. A sensor assembly for detecting direction of rotation of an object, comprising:
   a magnet having opposite poles and defining a center substantially midway between the poles, the center of the magnet being positioned along a central axis of the sensor assembly;
   a target wheel mechanically connected to the object;
   at least two sensing elements placed between the target wheel and the magnet, the magnet and sensing elements being configured so that as the target wheel rotates it causes each sensing element to output respective asymmetric signals relative to the direction of rotation of the object in response to sensing structure on the target wheel, each of said asymmetric signals being differentially combined to generate a combined signal indicative of the direction of rotation of the object; and
   a magnetic piece placed near the magnet, the magnetic piece being configured so that as the target wheel rotates it causes each sensing element to enhance the asymmetry in each output signal relative to the direction of rotation of the object.

6. The sensor assembly of claim 5, wherein the magnetic piece is placed adjacent to one side of the magnet.

7. The sensor assembly of claim 5, wherein the magnet defines a top, the magnetic piece includes an upper portion and a lateral portion extending therefrom, and wherein the magnetic piece is placed so that the upper portion is adjacent to the top of the magnet and the lateral portion is adjacent to one side of the magnet.

8. The sensor assembly of claim 7, wherein the upper portion of the magnetic piece is tapered.

9. A sensor assembly for detecting direction of rotation of an object, comprising:
   a magnet having opposite poles and defining a center substantially midway between the poles, the center of the magnet being positioned along a central axis of the sensor assembly, wherein the magnet comprises first and second segments for generating a first magnetic field and a second magnetic field;
   a target wheel mechanically connected to the object; and
   at least two sensing elements placed between the target wheel and the magnet, the magnet and sensing elements being configured so that as the target wheel rotates it causes each sensing element to output respective asymmetric signals relative to the direction of rotation of the object in response to sensing structure on the target wheel, each of said asymmetric signals being differentially combined to generate a combined signal indicative of the direction of rotation of the object.

10. The sensor assembly of claim 9, wherein the first magnetic field and the second magnetic field have different field strengths.

11. A sensor assembly for detecting direction of rotation of an object, comprising:
    a magnet having opposite poles and defining a center substantially midway between the poles, the center of the magnet being positioned along a central axis of the sensor assembly, wherein the magnet comprises first and second discrete magnets for generating a first magnetic field and a second magnetic field;
    a target wheel mechanically connected to the object; and
    at least two sensing elements placed between the target wheel and the magnet, the magnet and sensing elements being configured so that as the target wheel rotates it causes each sensing element to output respective asymmetric signals relative to the direction of rotation of the object in response to sensing structure on the target wheel, each of said asymmetric signals being differentially combined to generate a combined signal indicative of the direction of rotation of the object.

12. The sensor assembly of claim 11, wherein the first magnetic field and the second magnetic field have different field strengths.

13. The sensor assembly of claim 11, wherein the first and second magnetic fields have a mutually orthogonal direction relative to one another.

14. A target wheel sensor assembly for sensing at least direction of rotation of a target wheel, the sensor assembly defining a central axis and comprising:
- a target wheel defining a center, the center of the target wheel being located along the central axis;
- a magnet placed near the target wheel, the magnet defining a center intermediate opposite poles of the magnet, the center of the magnet being located along the central axis; and
- at least two sensing elements placed between the target wheel and the magnet, each of the sensing elements producing a respective asymmetric output signal relative to the direction of rotation of the target wheel in response to sensing structure on the target wheel as the wheel rotates, each output signal being differentially combined with one another to supply a combined output signal indicative of a direction of rotation of the target wheel and a position of the target wheel, wherein the magnet and each of the sensing elements are oriented perpendicular to the central axis, and wherein the magnet generates a magnetic field that is oriented at an angle with the central axis.

15. A target wheel sensor assembly for sensing at least direction of rotation of a target wheel, the sensor assembly defining a central axis and comprising:
- a target wheel defining a center, the center of the target wheel being located alone the central axis;
- a magnet placed near the target wheel, the magnet defining a center intermediate opposite poles of the magnet, the center of the magnet being located along the central axis; and
- at least two sensing elements placed between the target wheel and the magnet, each of the sensing elements producing a respective asymmetric output signal relative to the direction of rotation of the target wheel in response to sensing structure on the target wheel as the wheel rotates, each output signal being differentially combined with one another to supply a combined output signal indicative of a direction of rotation of the target wheel and a position of the target wheel, wherein the magnet defines a longitudinal axis and generates a magnetic field that is oriented perpendicular to the longitudinal axis, each of the sensing elements being oriented parallel to the longitudinal axis of the magnet, and wherein the magnet and each of the sensing elements is oriented at an angle with the central axis.

16. A target wheel sensor assembly for sensing at least direction of rotation of a target wheel, the sensor assembly defining a central axis and comprising:
- a target wheel defining a center, the center of the target wheel being located along the central axis;
- a magnet placed near the target wheel, the magnet defining a center intermediate opposite poles of the magnet, the center of the magnet being located along the central axis;
- at least two sensing elements placed between the target wheel and the magnet, each of the sensing elements producing a respective asymmetric output signal relative to the direction of rotation of the target wheel in response to sensing structure on the target wheel as the wheel rotates, each output signal being differentially combined with one another to supply a combined output signal indicative of a direction of rotation of the target wheel and a position of the target wheel; and
- a magnetic piece placed near the magnet, the magnetic piece being configured so that as the target wheel rotates it causes each of the sensing elements to enhance the asymmetry in each output signal relative to the direction of rotation of the target wheel.

17. A target wheel sensor assembly for sensing at least direction of rotation of a target wheel, the sensor assembly defining a central axis and comprising:
- a target wheel defining a center, the center of the target wheel being located along the central axis;
- a magnet placed near the target wheel, the magnet defining a center intermediate opposite poles of the magnet, the center of the magnet being located along the central axis, wherein the magnet generates at least a first magnetic field and at least a second magnetic field; and
- at least two sensing elements placed between the target wheel and the magnet, each of the sensing elements producing a respective asymmetric output signal relative to the direction of rotation of the target wheel in response to sensing structure on the target wheel as the wheel rotates, each output signal being differentially combined with one another to supply a combined output signal indicative of a direction of rotation of the target wheel and a position of the target wheel.

* * * * *